US011580751B2

(12) United States Patent
Takahashi et al.

(10) Patent No.: US 11,580,751 B2
(45) Date of Patent: Feb. 14, 2023

(54) IMAGING DEVICE, VIDEO RETRIEVING METHOD, VIDEO RETRIEVING PROGRAM, AND INFORMATION COLLECTING DEVICE

(71) Applicant: JVCKENWOOD Corporation, Yokohama (JP)

(72) Inventors: Manamu Takahashi, Yokohama (JP); Hideki Takehara, Yokohama (JP); Akinori Suyama, Yokohama (JP); Tatsumi Naganuma, Yokohama (JP); Satoru Hirose, Yokohama (JP); Takeshi Aoki, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 226 days.

(21) Appl. No.: 17/023,450

(22) Filed: Sep. 17, 2020

(65) Prior Publication Data

US 2021/0089789 A1 Mar. 25, 2021

(30) Foreign Application Priority Data

Sep. 20, 2019 (JP) .............................. JP2019-171221

(51) Int. Cl.
*G06V 20/56* (2022.01)
*G06F 16/787* (2019.01)
*G06F 16/78* (2019.01)
*G06V 20/40* (2022.01)

(52) U.S. Cl.
CPC ............ *G06V 20/56* (2022.01); *G06F 16/787* (2019.01); *G06F 16/7867* (2019.01); *G06V 20/41* (2022.01); *G06V 20/44* (2022.01)

(58) Field of Classification Search
CPC ........ G06V 20/56; G06V 20/41; G06V 20/44; G06V 2201/08; G06F 16/7867; G06F 16/787; G06K 9/6268
USPC ......................................................... 382/103
See application file for complete search history.

(56) References Cited

U.S. PATENT DOCUMENTS

2005/0102704 A1\* 5/2005 Prokupets ........ G08B 13/19656
725/116
2020/0145573 A1\* 5/2020 Tin .......................... G06V 40/23

FOREIGN PATENT DOCUMENTS

WO 2017/179182 10/2017

\* cited by examiner

*Primary Examiner* — Amandeep Saini
(74) *Attorney, Agent, or Firm* — Amin, Turocy & Watson, LLP (57) ABSTRACT

A drive recorder according to an embodiment of the present disclosure includes: an imaging unit that is mounted on a vehicle and captures a video of the surroundings of the vehicle; a video recording unit that has, recorded therein, video data captured; a network connecting unit that receives accident information including a time and date when an accident occurred and a place where the accident occurred; and a video retrieving unit that determines whether any video data captured in a predetermined time period and in a predetermined region are available in the video data recorded in the video recording unit, the predetermined time period including the time and date when the accident occurred, the predetermined region including the place where the accident occurred.

5 Claims, 5 Drawing Sheets

IMAGING DEVICE, VIDEO RETRIEVING METHOD, VIDEO RETRIEVING PROGRAM, AND INFORMATION COLLECTING DEVICE

CROSS-REFERENCE TO RELATED APPLICATIONS

This application claims priority from Japanese Application No. 2019-171221, filed on Sep. 20, 2019, the contents of which are incorporated by reference herein in its entirety.

BACKGROUND

1. Technical Field

The present disclosure relates to an imaging device, a video retrieving method, a video retrieving program, and an information collecting device.

2. Description of the Related Art

According to a technique that has been proposed conventionally, videos captured by drive recorders mounted on vehicles are transmitted to relevant facilities when, for example, events, such as traffic accidents, occur (as seen in, for example, International Publication Pamphlet No. WO 2017/179182). According a conventional technique of this type, when a person's own vehicle equipped with a drive recorder happens to be at the scene of an accident, video data having this accident captured therein are transmitted to a relevant facility; and thus the person does not need to directly hand over the video data to the relevant facility and vehicles involved in the accident are able to be readily deduced from the video data.

However, if the person's own vehicle did not happen to be at the scene of the accident, even if the drive recorder on the vehicle has captured a video of the vehicles involved in the accident around the time of the accident, the captured video data are unable to be utilized effectively.

SUMMARY

It is an object of the present disclosure to at least partially solve the problems in the conventional technology.

To solve the above problem and achieve the above object, an imaging device according to the present disclosure includes an imaging unit that captures video data; a video recording unit that has, recorded therein, the video data captured; an event information receiving unit that receives event information including a time and date when a predetermined event occurred and a place where the predetermined event occurred; and a video retrieving unit that determines whether any video data captured in a predetermined time period and in a predetermined region are available in the video data recorded in the video recording unit, the predetermined time period including the time and date of occurrence, the predetermined region including the place of occurrence.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Hereinafter, an embodiment according to the present disclosure will be described in detail, based on the drawings. The disclosure is not limited by this embodiment. Components in the following embodiment include those easily substitutable by persons skilled in the art or those that are substantially the same.

Figure 1:
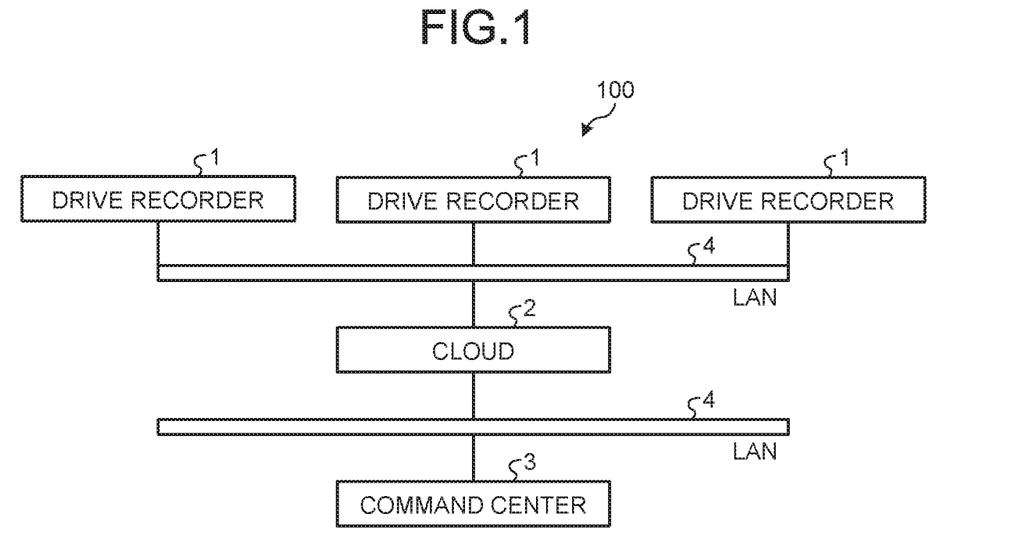
FIG. 1 is a diagram illustrating a schematic configuration of a vehicle searching system including a drive recorder according to an embodiment of the present disclosure.
Figure 2:
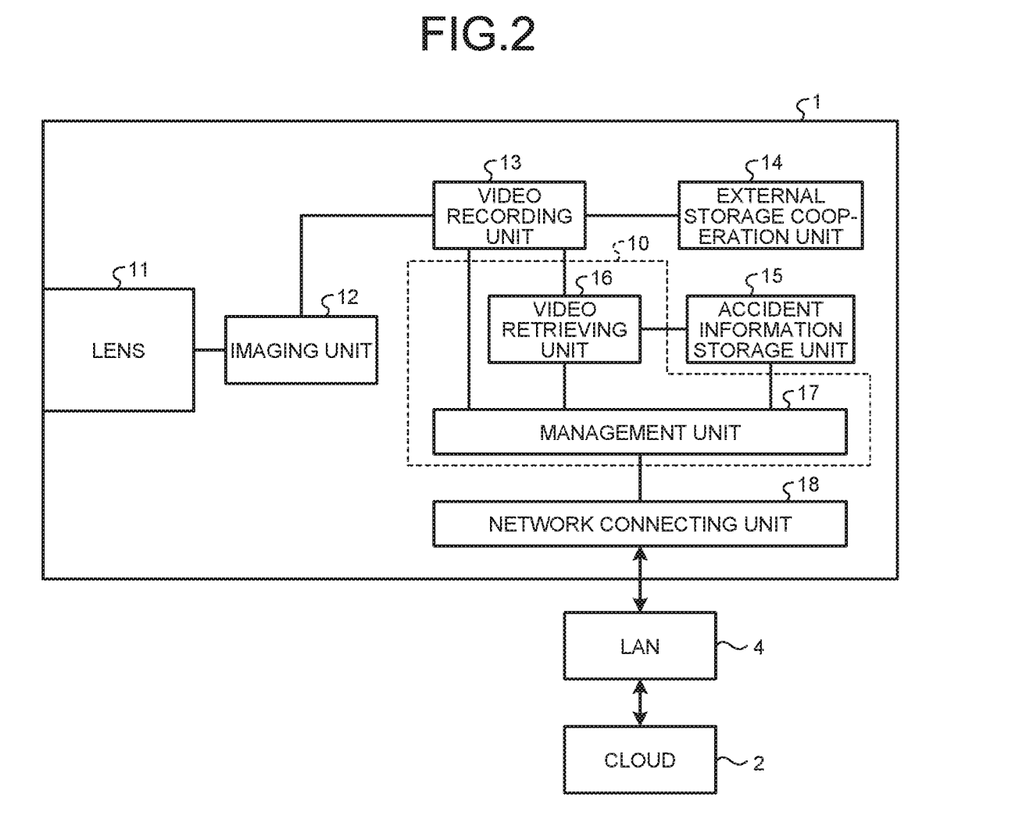
FIG. 2 is a block diagram illustrating a functional configuration of the drive recorder.
Figure 3:
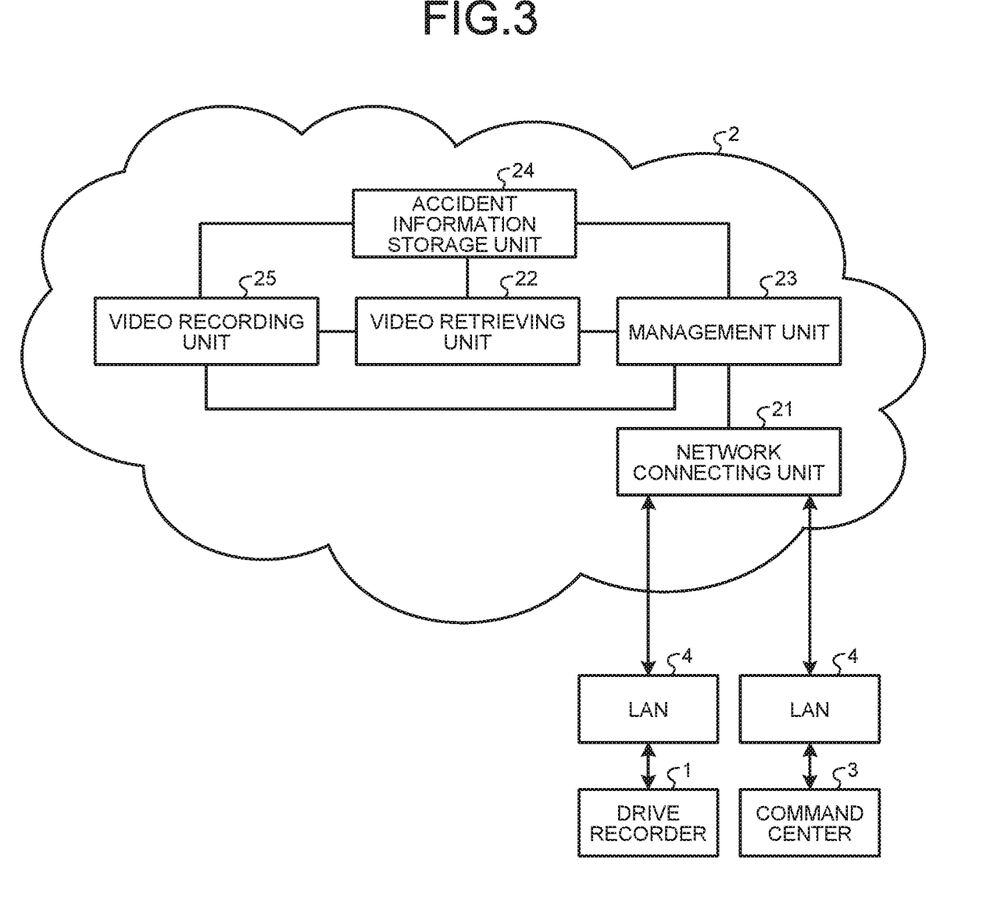
FIG. 3 is a block diagram illustrating a functional configuration of a cloud.
Figure 4:
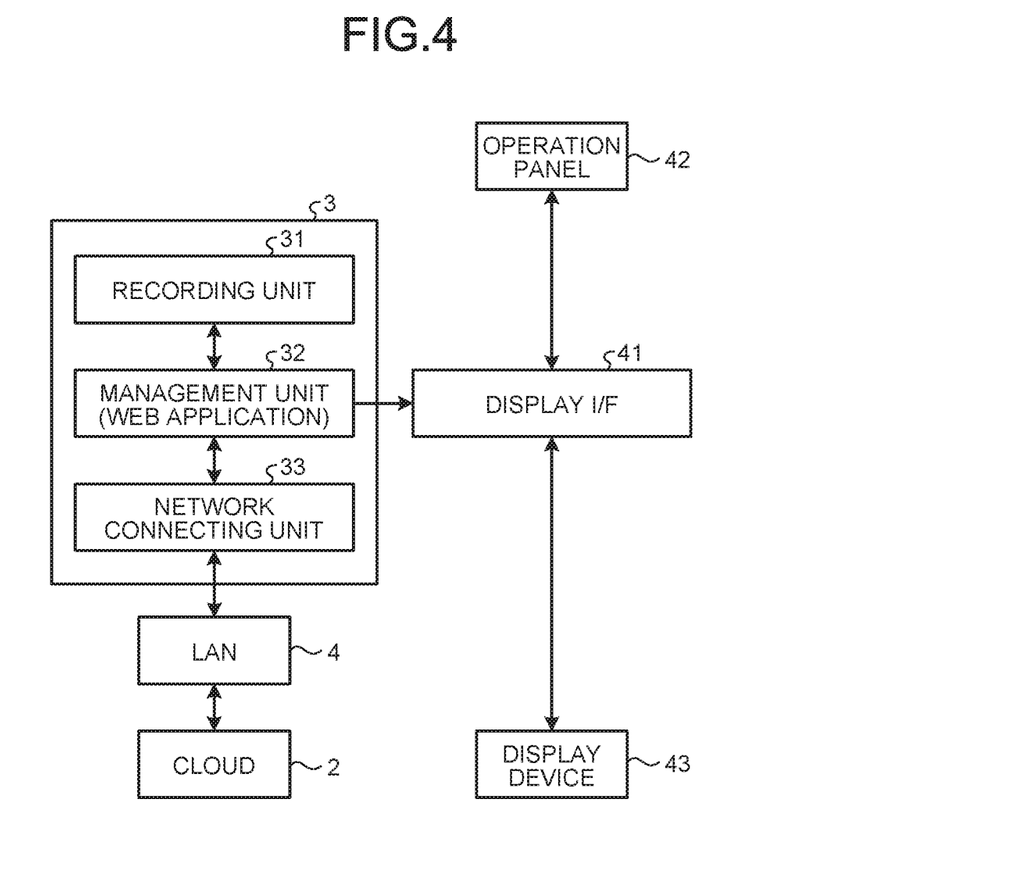
FIG. 4 is a block diagram illustrating a functional configuration of a command center.

FIG. 1 is a diagram illustrating a schematic configuration of a vehicle searching system including a drive recorder according to an embodiment of the present disclosure. FIG. 2 is a block diagram illustrating a functional configuration of the drive recorder. FIG. 3 is a block diagram illustrating a functional configuration of a cloud. FIG. 4 is a block diagram illustrating a functional configuration of a command center.

A vehicle searching system 100 (a moving body searching system) searches for an escaping vehicle (a moving body) involved in, for example, a hit-and-run accident (an event) when the hit-and-run accident occurs. The vehicle searching system 100 collects new information related to the accident from videos captured by plural drive recorders connected thereto beforehand, based on accident information (event information) including: a time and date and a place of occurrence of the accident; and/or information on a vehicle seen by a victim. As illustrated in FIG. 1, the vehicle searching system 100 include plural (three in FIG. 1) drive recorders (imaging devices), a cloud 2 (an information collecting device), and a command center 3 (an instructing terminal). A drive recorders 1 and the command center 3 are each network-connected to the cloud 2, via a local area network (LAN) 4. The LAN 4 relays between each of the drive recorders 1 and the cloud 2, or relays between the cloud 2 and the command center 3, and for example, a wireless LAN of, for example, WI-FI (registered trademark) is used as the LAN 4.

The drive recorders 1 have been set beforehand to form a part of the vehicle searching system 100 and have been communicably connected to the cloud 2. The drive recorders 1 are mounted on vehicles, such as automobiles, capture the surroundings of the vehicles, and record therein video (image) data that have been captured. According to this embodiment, video data are recorded continuously while the drive recorders 1 are being driven, regardless of occurrence of sudden braking and collisions, for example.

As illustrated in FIG. 2, the drive recorders 1 are each configured to have a lens 11, an imaging unit 12, a video recording unit 13, an external storage cooperation unit 14, an accident information storage unit 15, a video retrieving unit 16, a management unit 17, and a network connecting unit 18.

The imaging unit 12 captures a video (an image) of the surroundings of the vehicle via the lens 11 and forms, together with the lens 11, a camera. The video recording unit 13 is configured to include, for example, a RAM and a flash memory, and temporarily stores therein video data that have been captured. The external storage cooperation unit 14 is configured to enable an external storage medium, such as, for example, an SD card, to be inserted therein, and when this type of external storage medium has been inserted in the external storage cooperation unit 14, the external storage cooperation unit 14 executes storage of video data into the external storage medium. According to this embodiment, if an external storage medium having video data stored therein is available, this external storage medium is also included in the video recording unit 13.

The accident information storage unit 15 is configured to include, for example, a RAM and a flash memory, and when an accident, such as a traffic accident, occurs, the accident information storage unit 15 stores therein received accident information (event information) related to the accident. This accident information includes at least a time and date and a place of occurrence of the accident, and further includes vehicle information if information on any vehicle seen by a victim or an eyewitness is available. The vehicle information includes the color, the type, the brand mark, and/or characteristics of the shape, of the vehicle. The type of the vehicle distinguishes the vehicle, and may be based on, for example, large classification into types, such as passenger cars, trucks, and motor cycles, or middle classification into types, such as minivans, sedans, and hatchbacks. Furthermore, the type of the vehicle may be based on small classification according to vehicle names that are so-called pet names. The classification of the types of vehicles may be modified as appropriate as long as vehicles are able to be distinguished from one another. The brand mark is, for example, an emblem displayed at the front of the vehicle and indicating the manufacturer of the vehicle. The characteristics of the shape: are external appearance information obtained by presumption of how damaged the relevant vehicle (escaping vehicle) is from the extent of the victim's injuries and/or a state of damage to objects, such as a guard rail and a utility pole, around the scene of the accident; and may be, for example, information indicating that the vehicle has a dent at a right front portion of the vehicle.

The accident information is transmitted from the command center 3 to any vehicle (any drive recorder 1) that is in a predetermined range from the place of occurrence of the accident, but may be transmitted to all of the vehicles (the drive recorders 1) included in the vehicle searching system 100.

The video retrieving unit 16 searches for whether any vehicle related to the accident information stored in the accident information storage unit 15 is included in video data recorded in the video recording unit 13. Specifically, based on the time and date and the place of occurrence of the accident included in the accident information, the video retrieving unit 16 searches for whether any vehicle related to the accident information is included in video data captured in: a predetermined time period (for example, within 30 minutes after the accident or in the same time band of a day that is several days before the accident) including that time and date of occurrence; and a predetermined region (for example, within a radius of 3 km around the place of occurrence) including the place of occurrence. When an accident occurs, a vehicle involved in the accident (an escaping vehicle) is usually difficult to be identified if no eyewitness is available. According to this configuration, a vehicle related to accident information is retrieved from video data for a surrounding region in a time band around and including a time of day at which the accident occurred; and the video data captured around the time of the accident are thus able to be effectively utilized even if nobody happens to be at the scene at the time of occurrence of the accident.

The video retrieving unit 16 retrieves a relevant vehicle by using a discriminator (not illustrated in the drawings) trained beforehand for vehicle retrieval and set for each type (for example, each type of vehicle), like AdaBoost or a support vector machine. The video retrieving unit 16 sets a detection window for a video (an image), and extracts feature values to be used in a discriminator, from a region where the detection window has been set. By inputting the extracted feature values into the discriminator, the video retrieving unit 16 obtains a result of whether or not a vehicle related to accident information is present in the region where the detection window has been set.

According to this embodiment, the video retrieving unit 16 performs a search using a discriminator that has been set for each set of vehicle information (the color, type, brand mark, and/or characteristics of the shape, of a vehicle) included in accident information, and determines that a vehicle related to the accident information is included if there is a match with at least one of the color, type, brand mark, and feature points of the shape, of the vehicle. If, for example, accident information includes "white minivan", the accident information storage unit 15 determines that all vehicles including those of a type having a "white" color or a type "minivans" are vehicles related to the accident information. According to this configuration, the broader search conditions prevent any relevant vehicle from being excluded from the search.

Furthermore, the video retrieving unit 16 may score search results. For example, the larger the number of items matching the above mentioned items of the vehicle information (the color, type, brand mark, and characteristics of the shape, of the vehicle) is, the higher the score assigned to a result is. Accordingly, priority levels for utilization of video data are able to be prescribed by scores, and utilization of video data highly likely to be related to an accident is able to be prioritized. Furthermore, when a score is assigned, each item may be weighted for the score. For example, characteristics of the shape are an important item for determination of whether or not a vehicle is related to an accident. Therefore, if, for example, there is a match for the item, characteristics of the shape, assignment of a higher score to the item than to the other items enables prioritized utilization of video data including a vehicle more likely to be related to the accident.

The management unit 17 controls the above described storage operation for the accident information and video retrieving operation, and manages these operations. The video retrieving unit 16 and the management unit 17 function as a control unit 10, and may be formed of hardware, such as a microprocessor or a microcomputer. Furthermore, the video retrieving unit 16 and the management unit 17 are not necessarily formed of hardware, may be formed of software, or may be formed of a combination of software and hardware. The software (a program) that causes each component of the control unit 10 to operate may be provided as a computer program product in a file of an installable format or an executable format, by being recorded in a computer readable recording medium, such as a CD-ROM, a flexible disk (FD), a CD-R, or a DVD. The software may be configured to be stored on a computer connected to a network, such as the Internet, and provided by being downloaded via the network. In addition, the software may be configured to be provided or distributed via the network, such as the Internet. What is more, the software may be configured to be provided by being incorporated into a ROM, for example, beforehand.

The network connecting unit 18 transmits and receives various types of information in cooperation with the cloud 2. The network connecting unit 18 is, for example, an antenna and a connector. Specifically, the network connecting unit 18 functions as a receiving unit (an event information receiving unit) that receives accident information when the accident information has been transmitted from the cloud 2. Furthermore, the network connecting unit 18 functions as a transmitting unit that transmits a part or all of video data including a vehicle related to an accident, to the cloud 2, when the video data includes the vehicle. In this case, the video data transmitted may have, added thereto, information on a time and date and a position at which the video data were captured, and scores of search results as described above.

The cloud 2 provides service for collecting and storing video data including a vehicle related to an accident, the video data having been transmitted from each of the drive recorders 1. As illustrated in FIG. 3, the cloud 2 is configured to have a network connecting unit 21, a video retrieving unit 22, a management unit 23, an accident information storage unit 24, and a video recording unit 25.

The network connecting unit 21 transmits and receives various types of information in cooperation with each of the drive recorders 1 and the command center 3. The network connecting unit 21 is, for example, an antenna and a connector. Specifically, the network connecting unit 21 receives accident information transmitted from the command center 3 and transmits the accident information to each of the drive recorders 1. Furthermore, the network connecting unit 21 receives video data transmitted from each of the drive recorders 1. The video retrieving unit 22 searches for whether any vehicle related to the accident information is included in past video data accumulated in the video recording unit 25. The video retrieving unit 22 includes a configuration equivalent to those of the video retrieving units 16 of the drive recorders 1 and description thereof will thus be omitted.

The management unit 23 manages the overall operation of the cloud 2, receives a start command from the command center 3, and starts cooperation with each of the drive recorders 1 through the LAN 4. The management unit 23 may be formed of, for example, hardware, such as a microprocessor or a microcomputer. The management unit 23 performs control of transmitting accident information to each of the drive recorders 1 and control of recording video data transmitted from each of the drive recorders 1 into the video recording unit 25. The accident information storage unit 24 is formed of a storage medium, such as a hard disk having a large capacity, and stores therein accident information transmitted from the command center 3. The video recording unit 25 is formed of a storage medium, such as a hard disk having a large capacity, and stores therein video data transmitted from each of the drive recorders 1, the video recording unit 25 serving as a storage in the cloud 2.

The command center 3 performs input of accident information and inspection and management of video data stored in the cloud 2. The command center 3 is formed of, for example, a computer device or a portable terminal, such as a smartphone. As illustrated in FIG. 4, the command center 3 is configured to include a recording unit 31, a management unit 32, and a network connecting unit 33.

The network connecting unit 33 transmits and receives various types of information in cooperation with the cloud 2. The network connecting unit 33 is, for example, an antenna and a connector. Specifically, the network connecting unit 33 transmits accident information generated based on testimony of a victim and/or an eyewitness of an accident, to the cloud 2. Furthermore, the network connecting unit 33 receives, for example, an inspection right for video data stored in the cloud 2. If inspection has been permitted, the network connecting unit 33 communicates with the cloud 2 for viewing of the video data stored in the cloud 2. The recording unit 31 stores therein accident information generated at the command center 3 and an inspection right transmitted from the cloud 2.

The management unit 32, for example, causes the whole command center 3 to operate, and controls the operation, such as the input of accident information and the inspection of video data provided. The management unit 32 may be formed of, for example, hardware, such as a microprocessor or a microcomputer, and serves its functions by being caused to execute an application. The management unit 32 has an operation panel 42 and a display device 43 both connected thereto, via a display interface 41. Through these operation panel 42 and display device 43, a user (an operator) performs operation, such as input of accident information and inspection of video data provided, and is able to search for a vehicle involved in an accident (an escaping vehicle) or presume a route travelled by the vehicle involved in the accident, by using the video data. Furthermore, the recording unit 31 may have, stored therein, information transmitted and received by the command center 3. The recording unit 31 may be, for example, a removable recording medium, such as an SD card, or a memory that has been incorporated in the command center 3. The command center 3 may be configured, for example, to receive a download right from the cloud 2, to download a part of video data stored in the cloud 2 to the recording unit 31 in the command center 3, and to use the downloaded part in a search for a vehicle involved in an accident (an escaping vehicle).

Figure 5:
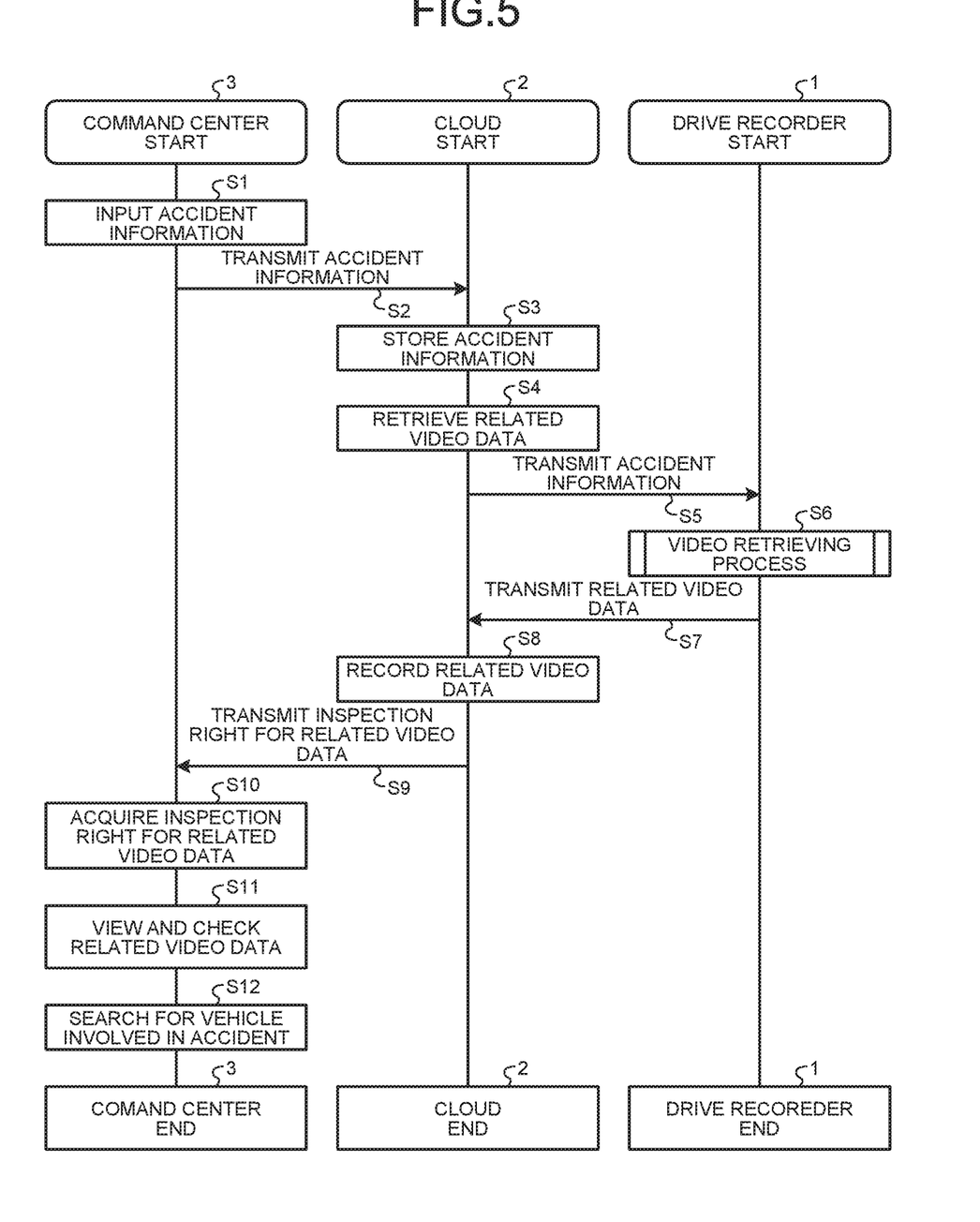
FIG. 5 is a flow chart illustrating an operating procedure of the vehicle searching system.

Operation of the vehicle searching system 100 will be described next. FIG. 5 is a flow chart illustrating an operating procedure of a vehicle searching system. Firstly, when accident information is input to the command center 3 (Step S1), the accident information including vehicle information and a time and date and a place of occurrence of an accident, the management unit 32 in the command center 3 transmits, via the network connecting unit 33 and the LAN 4, the input accident information to the cloud 2 (Step S2). The management unit 23 of the cloud 2 receives the accident information and stores the received accident information into the accident information storage unit 24 (Step S3).

Subsequently, based on the received accident information, the video retrieving unit 22 in the cloud 2 searches for whether any vehicle related to the accident information is included in past video data that have been recorded in the video recording unit 25 (Step S4). Video data including the vehicle related to the accident information will be referred to as related video data. According to this embodiment, the video data in the video recording unit 25 are assumed to not include the vehicle related to the accident information (that no related video data are able to be found). If no related video data are able to be found, the management unit 23 in the cloud 2 transmits, via the network connecting unit 21 and the LAN 4, the accident information to each of the drive recorders 1 (Step S5).

When each of the drive recorders 1 receives the accident information, the drive recorders 1 each execute a video retrieving process (Step S6). This video retrieving process will be described later. If video data including the vehicle related to the accident information (related video data) have been found in any of the drive recorders 1, the related video data are transmitted to the cloud 2 (Step S7), and the drive recorders 1 end the process. The related video data include video data obtained by direct video (image) capturing of the accident. If no related video data have been found, although illustration thereof will be omitted, a signal indicating that related video data are unavailable may be transmitted, instead of related video data, to the cloud 2 and the command center 3, and the operation of the vehicle searching system 100 may be ended.

The management unit 23 in the cloud 2 receives the related video data transmitted from the drive recorder 1 and records the received related video data into the video recording unit 25 (Step S8). Subsequently, the management unit 23 in the cloud 2 transmits, via the network connecting unit 21 and the LAN 4, an inspection right for the related video data recorded in the video recording unit 25, to the command center 3 (Step S9), and the cloud 2 then ends the process.

The management unit 32 of the command center 3 receives the inspection right transmitted and records (acquires) this inspection right into the recording unit 31 (Step S10). By use of the acquired inspection right, viewing (inspection) and check of the related video data recorded in the video recording unit 25 of the cloud 2 are performed (Step S11). A user (an operator) operating the command center 3 searches for the vehicle involved in the accident (the escaping vehicle) by using the video data and presumes a route travelled by the vehicle involved in the accident (Step S12), and the command center 3 then ends the process.

Figure 6:
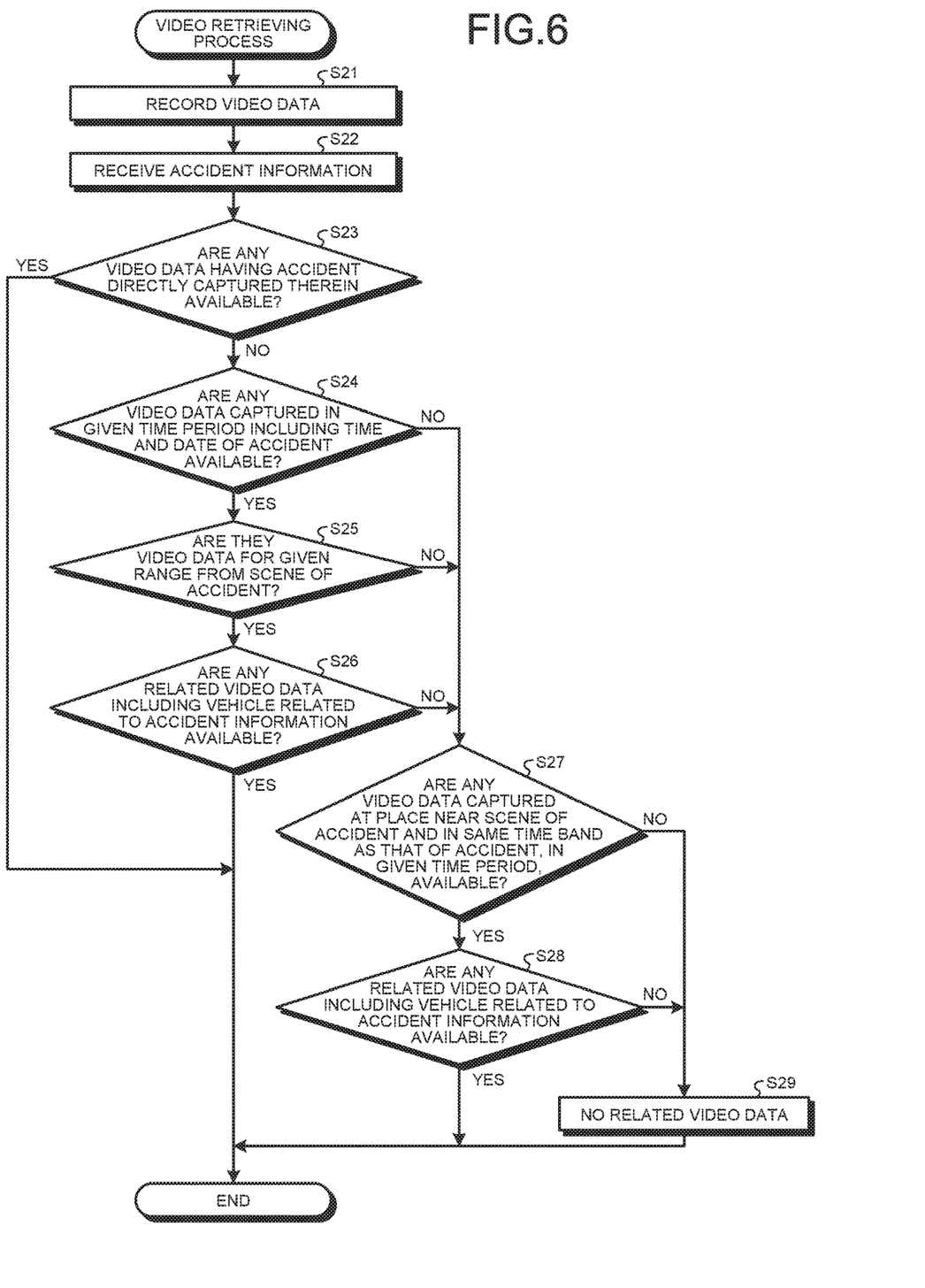
FIG. 6 is a flow chart illustrating an operating procedure for a video retrieving process.

Operation for the video retrieving process (a video retrieving method) at the drive recorder 1 will be described next. FIG. 6 is a flow chart illustrating an operating procedure for the video retrieving process. Similarly to usual drive recorders, the drive recorders 1 capture videos (images) of the surroundings of their vehicles and have video data recorded in their video recording units 13 (Step S21). When the video retrieving unit 16 in each of the drive recorders 1 receives accident information from the cloud 2 (Step S22), based on this accident information, the video retrieving unit 16 searches for whether any video data having the accident directly captured therein have been recorded in the video recording unit 13. The accident information includes information on the time and date and the place of occurrence of the accident. Therefore, the video retrieving unit 16 determines whether any video data captured at the same time of day and at the same position as the accident are available. In this determination, when the video data having the accident directly captured therein are available (Step S23; Yes), the process is ended. It has been described above that the video retrieving unit 16 determines whether any video data captured at the same time of day and at the same position as the accident are available, but the position where the video data were captured is not necessarily the same, and may be near (for example, within 200 meters from) the place specified by the accident information.

On the contrary, if no video data having the accident directly captured therein are available (Step S23; No), the video retrieving unit 16 searches for whether any video data captured in a given time period including the time and date of the accident have been recorded in the video recording unit 13 (Step S24). This given time period may be specified by the command center 3, and according to this embodiment, has been specified to be a predetermined time period (for example, 30 minutes) or less from the time of day of occurrence of the accident.

If no video data captured in the predetermined time period (for example, 30 minutes) or less from the time of day of occurrence of the accident are available (Step S24; No), the process is advanced to Step S27. On the contrary, if video data captured in the predetermined time period (for example, 30 minutes) or less from the time of day of occurrence of the accident are available (Step S24; Yes), the video retrieving unit 16 checks whether those video data have been captured at a place that is in a given range from the scene of the accident (Step S25). This given range may also be specified by the command center 3, and according to this embodiment, has been specified to be at a predetermined distance (for example, 3 km) or less from the scene of the accident.

If the above described video data have not been captured at the predetermined distance (for example, 3 km) or less from the scene of the accident (Step S25; No), the process is advanced to Step S27. On the contrary, if the above described video data have been captured at the predetermined distance (for example, 3 km) or less from the scene of the accident (Step S25; Yes), the video retrieving unit 16 searches for whether any video data including a vehicle related to the accident information (related video data) have been recorded in the video recording unit 13 (Step S26). Specifically, the video retrieving unit 16 performs search for each set of vehicle information included in the accident information (the color, type, brand mark, and/or characteristics of the shape, of the vehicle). Specifically, when the video retrieving unit 16 searches for a vehicle related to the accident information based on the type, brand mark, and characteristics of the shape, the video retrieving unit 16 generates a template for search from the type, brand mark, and characteristics of the shape, and performs a search through pattern matching with respect to video data by using the template. Furthermore, when the video retrieving unit 16 searches for a vehicle related to the accident information based on the color, the video retrieving unit 16 performs pattern matching with respect to video data by using a template for the vehicle, and performs a search by specifying the color of an object determined to correspond to the vehicle. Such vehicle information may be individually specified by the command center 3, and for example, mere ambiguous information, such as the color and shape of the vehicle, may be specified. Furthermore, if the state of damage to the vehicle involved in the accident (the escaping vehicle) is able to be presumed from the extent of injuries of the victim, characteristics of the shape based on this presumption are able to be specified. If at least one of these color, type, brand mark, and characteristics of the shape, of the vehicle has a match, the video retrieving unit 16 determines that related video data are available.

If related video data are available (Step S26; Yes), the video retrieving process is ended. On the contrary, if no related video data are available (Step S26; No), the video retrieving unit 16 changes (broadens) the search conditions to retrieve a video. For example, if a vehicle involved in the accident (an escaping vehicle) is expected to have been travelling the place of the accident on a daily basis, a clue for identifying the vehicle involved in the accident may be left in video data captured at a time that is, for example, a day or a week before the accident and at a place near the scene of the accident. Therefore, the video retrieving unit 16 searches for whether any video data captured in the same time band as the accident and at a place near the scene of the accident, in a given time period before the accident, are available (Step S27). The same time band refers to a specific time period on a different date, for example, from 9 o'clock to 10 o'clock.

If no video data captured in the same time band as the accident and at a place near the scene of the accident, in the given time period before the accident, are available (Step S27; No), the management unit 17 determines that no related video data are available (Step S29) and ends the video retrieving process. In this case, information indicating that no related video data are available may be transmitted to the cloud 2 and command center 3. On the contrary, if video data captured in the same time band as the accident and at a place near the scene of the accident, in the given time period before the accident, are available (Step S27; Yes), the video retrieving unit 16 searches for whether any video data including the vehicle related to the accident information (related video data) have been recorded in the video recording unit 13 (Step S28). If no related video data are available (Step S28; No), the management unit 17 advances the process to Step S29. On the contrary, if related video data are available (Step S28; Yes), the management unit 17 ends the video retrieving process. In this case, by the management unit 17 transmitting only information on the time and date and the site of capture of the relevant video data, to the cloud 2, the information is able to be used as a clue for an investigation at the command center 3.

According to the embodiment, the operation of the video retrieving process has been described by use of FIG. 6, but the video retrieving process does not necessarily include the processing at Step S27 and Step S28. In that case, if no related video data are available at Step S26, the video retrieving process may be ended directly from Step S26.

As described above, the drive recorders 1 according to the embodiment each include: the imaging unit 12 that is mounted on a vehicle and captures a video (an image) of the surroundings of the vehicle; the video recording unit 13 that has, recorded therein, video data captured; the network connecting unit 18 that receives accident information including a time and date and a place of occurrence of an accident; and the video retrieving unit 16 that determines whether any video data captured in a predetermined time period and in a predetermined region are available in the video data recorded in the video recording unit 13, the predetermined time period including the time and date of occurrence of the accident, the predetermined region including the place of occurrence of the accident; and video data captured at a time around the accident are thus able to be effectively utilized even if nobody happens to be at the scene at the time of occurrence of the accident.

Furthermore, according to the embodiment, if the video retrieving unit 16 determines that no video data captured in the predetermined time period and in the predetermined region are available in the video data recorded in the video recording unit 13, the predetermined time period including the time and data of occurrence of the accident, the predetermined region including the place of occurrence of the accident, the video retrieving unit 16 determines whether any video data captured in a predetermined time band and in a predetermined region are available, the predetermined time band including the time of day when the accident occurred, the time of day being on a day different from the date of occurrence, the predetermined region including the place of occurrence; and a clue related to the accident is thus able to be retrieved from video data having, captured therein, for example, a place near the scene of the accident a day or a week before the accident, and video data captured at a time around the accident are thus able to be utilized effectively.

Furthermore, according to the embodiment, the accident information includes information related to the color, type, shape, or brand mark, of the vehicle; if the video retrieving unit 16 has determined that video data captured in a predetermined time band and in a predetermined region are available, the predetermined time band including the time of day of occurrence, the time of day being on a day different from the date of occurrence, the predetermined region including the place of occurrence, the video retrieving unit 16 determines whether a vehicle having this color, type, shape, or brand mark is included in the video data determined to be available; and the management unit 17 is included, the management unit 17 being configured to perform control of transmitting information related to the time of day and place at which the video data including the vehicle were captured if the vehicle having that color, type, shape, or brand mark has been determined to be included. Therefore, by receiving just the information on the time and date and the site at which the relevant video data were captured, for example, the information is able to be used as a clue for an investigation for the vehicle at the command center 3.

In addition, according to the embodiment, if a vehicle related to an accident is included in video data, the network connecting unit 18 transmits the video data including this vehicle, to the cloud 2, and thus video data are readily provided to the cloud 2 from each of the drive recorders 1 and the time, effort, and burden taken by informers are able to be reduced. Furthermore, video data are able to be collected in the cloud 2 and a search for a relevant vehicle is able to be implemented readily by access to the cloud 2.

Furthermore, the cloud 2 according to the embodiment includes: the video recording unit 25 that has, recorded therein, video data; the network connecting unit 21 that receives accident information including a time and date and a place of occurrence of an accident; and the video retrieving unit 22 that determines whether any video data captured in a predetermined time period and a predetermined region are available in the video data recorded in the video recording unit 25, the predetermined time period including the time and date of occurrence of the accident, the predetermined region including the place of occurrence of the accident; and numerous video data captured by the plural drive recorders 1 at times around the accident are thus able to be effectively utilized. In addition, the cloud 2 according to the embodiment includes the management unit 23 that performs control of transmitting the accident information if it has been determined that no video data captured in the predetermined time period and in the predetermined region are available, the predetermined time period including the time and date of occurrence of the accident, the predetermined region including the place of occurrence of the accident; and information, such as the time and date and the place at which the relevant video data have been captured, is thus able to be used as a clue for an investigation for the vehicle at the command center 3, by the command center 3 receiving, for example, just that information.

An embodiment of the present disclosure has been described hereinbefore, but the present disclosure is not limited to this embodiment. For example, according to the above description of the embodiment, the moving body is a vehicle that has caused a hit-and-run accident, but the disclosed techniques are also applicable to a search for a suspect (a moving body) who has escaped in a random assault, for example.

According to the present disclosure, a search on whether any moving body related to an event is included in video data is conducted, based on event information received by a video retrieving unit, and video data captured, for example, at times around events, such as accidents, are able to be effectively utilized.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging device, comprising:
an imaging unit that captures video data;
a video recording unit that has, recorded therein, the video data; an event information receiving unit that receives event information including a time and date when a predetermined event occurred and a place where the predetermined event occurred; and
a video retrieving unit that determines whether any video data captured in the time and date of occurrence and in the place of occurrence is available in the video data recorded in the video recording unit, wherein
in response to determining that no video data captured in the time and date of occurrence and in the place of occurrence is available in the video data recorded in the video recording unit, the video retrieving unit determines whether any video data captured in a time period is available, the time period including the time and date of occurrence broadened,
in response to determining that the video data captured in the time period is available in the video data recorded in the video data recording unit, the video retrieving unit determines whether any video data captured in a region is available, the region including the place of occurrence broadened, and
in response to determining that no video data captured in the time period and in the region is available in the video data recorded in the video recording unit, the video retrieving unit determines whether any video data captured in a predetermined time band and in surroundings of the place of occurrence is available, the predetermined time band including a time of day of occurrence, the time of day being on a day different from the date of occurrence.

2. The imaging device according to claim 1, wherein
the event information includes information related to a color, a type, a shape, or a brand mark,
in response to determining that the video data captured in the predetermined time band and the surroundings of the place of occurrence is available, the predetermined time band including the time of day of occurrence, the time of day being on a day different from the date of occurrence, the video retrieving unit determines whether a moving body having the color, the type, the shape, or the brand mark is included in the video data determined to be available, and
the imaging device further comprise a management unit that performs control of transmitting information related to the time of day and the place at which the video data including the moving body were captured, in response to determining that the moving body having the color, the type, the shape, or the brand mark is included.

3. A video retrieving method, comprising:
capturing video data;
recording the video data;
receiving event information including a time and date when a predetermined event occurred and a place where the predetermined event occurred; and
determining whether any video data captured in the time and date of occurrence and in the place of occurrence is available in the video data, wherein the determining comprises:
in response to determining that no video data captured in the time and date of occurrence and in the place of occurrence is available in the video data, determining whether any video data captured in a time period is available, the time period including the time and date of occurrence broadened,
in response to determining that the video data captured in the time period is available in the video data, determining whether any video data captured in a region is available, the region including the place of occurrence broadened, and
in response to determining that no video data captured in the time period and in the region is available in the video data, determining whether any video data captured in a predetermined time band and in surroundings of the place of occurrence is available, the predetermined time band including a time of day of occurrence, the time of day being on a day different from the date of occurrence.

4. A non-transitory computer readable recording medium storing therein a video retrieving program that causes a computer to perform operations, the operations comprising:
capturing video data;
recording the video data;
receiving event information including a time and date when a predetermined event occurred and a place where the predetermined event occurred; and
determining whether any video data captured in the time and date of occurrence and in the place of occurrence is available in the video data recorded, wherein the determining comprises:
in response to determining that no video data captured in the time and date of occurrence and in the place of occurrence is available in the video data, determining whether any video data captured in a time period is available, the time period including the time and date of occurrence broadened,
in response to determining that the video data captured in the time period is available in the video data, determining whether any video data captured in a region is available, the region including the place of occurrence broadened, and
in response to determining that no video data captured in the time period and in the region is available in the video data, determining whether any video data captured in a predetermined time band and in surroundings of the place of occurrence is available, the predetermined time band including a time of day of occurrence, the time of day being on a day different from the date of occurrence.

5. An information collecting device, comprising:
a video recording unit configured to record video data;
an event information receiving unit configured to receive event information including a time and date when a predetermined event occurred and a place where the predetermined event occurred;
a video retrieving unit configured to determine whether any video data captured in the time and date of occurrence and in the place of occurrence is available in the video data recorded in the video recording unit; and
a management unit configured to perform control of transmitting the event information when no video data has been determined to be available, wherein the video retrieving unit is configured to, in response to determining that no video data captured in the time and date of occurrence and in the place of occurrence is available in the video data recorded in the video recording unit, determine whether any video data captured in a time period is available, the time period including the time and date of occurrence broadened, in response to determining that the video data captured in the time period is available in the video data recorded in the video data recording unit, determine whether any video data captured in a region is available, the region including the place of occurrence broadened, and in response to determining that no video data captured in the time period and in the region is available in the video data recorded in the video recording unit, determine whether any video data captured in a predetermined time band and in surroundings of the place of occurrence is available, the predetermined time band including a time of day of occurrence, the time of day being on a day different from the date of occurrence.

* * * * *